United States Patent [19]

Van Thillo et al.

[11] 3,993,592

[45] Nov. 23, 1976

[54] PROCESS FOR PREPARING CATALYSTS FOR THE HYDROTREATING OF PETROLEUM FRACTIONS

[75] Inventors: Hugo Johannes Van Thillo, Grimbergen; René Odon Lammers, Brussels; Henri Robert Debus, Meise; Raymond Marc Cahen; Jacques Maurice Jules Ghislain André, both of Brussels, all of Belgium

[73] Assignee: Labofina S.A., Brussels, Belgium

[22] Filed: Feb. 10, 1975

[21] Appl. No.: 548,211

[30] Foreign Application Priority Data

Feb. 18, 1974 Luxembourg.......................... 69409

[52] U.S. Cl................................ 252/439; 252/448; 252/465
[51] Int. Cl.² ..................... B01J 27/04; B01J 21/04; B01J 23/84
[58] Field of Search..................... 252/439, 448, 465

[56] References Cited

UNITED STATES PATENTS

| 2,867,581 | 1/1959 | Nahin ................................ 252/465 |
| 2,875,159 | 2/1959 | Erickson ........................... 252/448 |
| 3,705,861 | 12/1972 | Oguchi et al. ..................... 252/448 |
| 3,776,987 | 12/1973 | Grimes et al. .................. 252/448 X |

Primary Examiner—W. J. Shine

[57] ABSTRACT

A process for producing catalysts for hydrotreating petroleum fractions, said catalysts containing, after thermal treatment, at least an oxide or a sulphide of a Group VIII metal and at least an oxide or a sulphide of a Group VI B metal and an alumina support, said process comprising preparing said catalyst in the form of beads by agglomeration of alumina by polymerizing, in a hot substantially water-immiscible fluid medium, an aqueous mixture consisting essentially of alumina hydrogel and a water-soluble monomer whose uncrossed-linked polymer is water-soluble or forms a gel, and thereafter dispersing said aqueous mixture in the form of droplets, into said fluid medium in which substantial polymerization of the monomer is carried out.

10 Claims, No Drawings

PROCESS FOR PREPARING CATALYSTS FOR THE HYDROTREATING OF PETROLEUM FRACTIONS

BACKGROUND OF THE INVENTION

The present invention relates to a process for preparing catalysts useful for hydrotreating petroleum fractions. The present invention further relates to new catalysts and to a hydrotreatment process employing such catalysts.

When crude oils are distilled, the different fractions obtained contain amounts of impurities such as sulphur, nitrogen, vanadium, nickel, etc., which vary in amount with the origin of the treated crude. For most further use, these fractions must be improved. Such improvement generally is performed by a hydrogenating catalytic treatment or hydrotreatment. The additional advantage of this hydrogenating treatment is to allow the conversion of heavy fractions into light fractions. The catalysts which are generally so used are those containing an oxide of a Group VIII metal, particularly cobalt or nickel, and/or an oxide of a Group VI B metal, particularly molybdenium or tunsten, and a carrier which most often is an alumina.

For the industrial application of such hydrotreating processes, catalyst life must be as long as possible for economic reasons. Further, it is necessary that the catalyst have a high mechanical strength and a high activity.

Several processes for preparing hydrotreating catalysts are known, and their object generally is to obtain catalysts having a high specific surface or pores of determined sizes. However, comparative experiments with commerical catalysts have shown that the activity of hydrotreating catalysts does not depend only on these physical properties. These experiments have shown that a prominent criteria is the crushing strength and abrasion strength of the catalyst. It has been found that catalysts in the form of beads have more strength and resistance than extruded catalysts. Generally, such catalysts are prepared from alumina beads. The alumina beads are impregnated with the catalytic agents.

Several processes have been proposed for preparing spheroidal alumina particles. One of such process comprises dispersing an alumina hydrosol as droplets into a medium wherein gelling occurs, and thereafter, subjecting the beads which are obtained in the form of alumina hydrogel, to one or more aging treatments in order to obtain beads having a suitable mechanical resistance. According to another known process, an alumina hydrosol is mixed with an ammonium salt and a synthetic polymer or a natural gum, the mixture is dispersed into a water-immiscible medium to form beads and thereafter subjected to an aging treatment. However, these processes have the disadvantage of requiring long treatment times which render them uneconomic. Further, alumina beads prepared by some of the known processes contain high amounts, even excessive sometimes, of impurities which are undesirable when these beads are used as supports for hydrotreating catalysts.

An object of the present invention is to provide a new and simple method of preparing spheroidal catalyst particles using an alumina support.

Another object of the present invention is to provide a method of preparing particles whose catalytic activity is not inhibited by impurities.

A further object of the present invention is to provide a process for preparing catalyst particles having uniform sizes.

Still another object of the present invention is to provide a process for preparing hydrotreating catalysts.

A remaining object of the present invention is to provide a method for preparing hydrotreating catalysts in the form of beads having a smooth surface, high mechanical strength and a high activity.

SUMMARY OF THE INVENTION

The present invention is a process for producing catalysts for the hydrotreatment of petroleum fractions, said catalysts containing after thermal treatment such as drying and calcining, at least an oxide or a sulphide of a Group VIII metal and at least an oxide or a sulphide of a Group VI B metal and an alumina support, said process comprising preparing said catalysts in the form of beads which are agglomerated with alumina, by polymerizing, in a hot and substantially water-immiscible fluid, an aqueous mixture which consists essentially of at least alumina hydrogel and at least a water-soluble monomer whose uncrossed-linked polymer is water-soluble or forms a gel, and thereafter dispersing said aqueous mixture in the form of droplets into the hot fluid wherein substantial polymerization of the monomer is performed.

More particularly, the process of the invention comprises producing an aqueous mixture consisting essentially of alumina hydrogel and at least a water soluble monomer whose uncrossed-linked polymer is water soluble or forms a gel, this aqueous mixture being dispersed as droplets into a hot and substantially water-immiscible fluid, substantially polymerizing said monomer contained in each droplet of said aqueous mixture, recovering beads consisting essentially of alumina hydrogel agglomerated by the polymer, impregnating said beads with a solution of at least a compound capable of generating an oxide or a sulphide of a Group VIII metal, and at least a compound capable of generating an oxide or a sulphide of a Group VI B metal, and thereafter subjecting said beads to a thermal treatment.

A preferred embodiment of the invention comprises preparing an aqueous mixture consisting essentially of from 5 to 30% by weight (based on metallic oxide) of the alumina hydrogel, 0.25 to 20% by weight of at least a water-soluble ethylenically unsaturated monomer whose uncrossed-linked polymer is water-soluble or forms a gel, and 0.05 to 2% by weight of a polymerization catalyst, dispersing said aqueous mixture, as droplets, into a water-immiscible fluid, having a temperature of 50° to 105° C, at atmospheric pressure, maintaining said droplets in said fluid until beads are formed and become hard, recovering said beads, impregnating said beads with a solution of at least a compound capable of generating, an oxide or a sulphide of a Group VIII metal and at least a compound capable of generating an oxide or a sulphide of a Group VI B metal, and subjecting said beads to a thermal treatment.

A preferred embodiment of the invention comprises preparing an aqueous mixture consisting essentially of from 5 to 29.95% by weight (based on aluminum oxide) of alumina hydrogel, 0.05 to 10% by weight of at least a compound capable of generating an oxide or a sulphide of Groups VIII and VI B metals (based on oxide or sulphide), the total amount of hydrogel and said compounds not exceeding 30% by weight, 0.25 to 20% by weight of at least a water-soluble monomer, ethylenically unsaturated, whose uncrossed-linked polymer is water-soluble or forms a gel, and 0.05 to 2% by weight of polymerization catalysts, dispersing said aqueous mixture, as droplets, into a water-immiscible fluid, having a temperature of 50° to 105° C at atmospheric pressure, maintaining said droplets in this medium until beads are formed and become hard, drying or drying and calcining said beads.

DESCRIPTION OF PREFERRED EMBODIMENTS

According to one of the embodiment of the present process for preparing catalysts, alumina beads prepared as taught herein are treated with solutions of compounds generating the Group VIII and Group VI B metal oxides or sulphides. After such treatment the beads are subjected to a thermal treatment. Preferably, impregnation of beads which are already dried and calcined, is performed with solutions of compounds generating oxides or sulphides, this method allowing preparation of catalysts containing precise amounts of metallic oxides or sulphides. When several successive impregnations are performed, the beads are preferably subjected to a thermal treatment (drying or calcining) following each impregnation. Of course, a mixed process may be employed comprising using an aqueous mixture of alumina hydrogel and at least a compound capable of generating a Group VIII or VI B metallic oxide or sulphide and forming the impregnated bead, and thereafter impregnating such beads with at least another compound capable of generating a metallic oxide or sulphide, and then subjecting the beads to a thermal treatment. Beads impregnation with a solution of at least a compound generating a metallic oxide or sulphide, as hereabove defined, may be performed on the undried beads, or on the dried beads or on the calcined beads.

According to the process of the present invention, the alumina hydrogel and the compounds capable of generating metallic oxides or sulphides, added to the starting aqueous mixture, are introduced, in a finely divided form, in order to ensure an easy dispersion into the starting aqueous mixture.

Alumina hydrogel may be prepared by any known method and particularly by treating aluminum sulphate with a base, by hydrolyzing an aluminum alcoholate such as aluminum isopropylate, or by treating an alkali aluminate with an acid or with aluminum sulphate. The precipitate obtained is waterwashed and dried. The term "alumina hydrogel" as used herein includes not only this compound in a substantially pure form, but also this compound containing a minor amount of silica, alkali silicate or similar material. In other words, the starting aqueous mixture may contain sodium silicate in an amount (based on SiO$_2$) which may reach 20% of the alumina hydrogel weight (based on Al$_2$O$_3$).

The compound capable of generating an oxide or a sulphide of Groups VIII and VI B metals may be an oxide or sulphide itself or a compound which gives this oxide or sulphide by thermal or chemical treatment. In other words, an ammonium molybdate may be used as the compound for producing molybdenum oxide and cobalt nitrate as the compound for producing cobalt oxide. Other useful such compounds include nickel nitrate or chloride, cobalt acetate or chloride, ammonium chromate, chromium oxalate or the like. According to a preferred embodiment of the invention, at least one of these compounds is introduced into the starting aqueous mixture generally, in an amount which does not exceed 10% of such mixture by weight.

The starting aqueous mixture must remain sufficiently free flowing at room temperature to allow an easy dispersion thereof in the form of droplets into the polymerization mixture. In order to avoid excessive investment and drying costs of the beads obtained by the process, too dilute solutions of the starting aqueous mixture are to be avoided. Preferably, aqueous mixtures which are used contain in a finely divided form, from 5 to 30% by weight of alumina hydrogel (based on Al$_2$O$_3$) and compounds capable of generating a metallic oxide or sulphide (based on dry metallic oxide or sulphide). In some instances, alumina hydrogel may have the tendency to stiffen in the presence of water, this tendency to stiffening depending on hydrogel type, its preparation method, its degree of purity and on monomer type. However, this stiffening does not result from a polymerization of the monomer. This stiffening may be avoided by subjecting the aqueous mixture to a vigorous stirring and/or by adding, as hereafter described, an acid compound. More particularly, the aqueous mixtures which are used contain about 7.5 to 20% by weight of alumina hydrogel and compound capable of generating metallic oxide or sulphide. Higher proportions may be used, however, to the extent the starting aqueous mixture remains sufficiently free flowing.

The water-soluble monomer whose uncrossed-linked polymer is water-soluble or forms a gel is selected from the group consisting of ethylenically unsaturated compounds comprising acrylic compounds of general formula

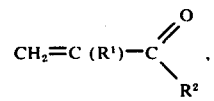

wherein R$^1$ is H or a methyl radical and R$^2$ is a —OR$^3$, or —NR$^3$R$^4$ radical with R$^3$ and R$^4$ in such radical being H or a hydrophilic radical, particularly a hydroxyalkyl radical containing from 1 to 2 carbon atoms or a methoxy methyl radical. Non-limiting examples of such compounds are acrylic acid, methacrylic acid, acrylamide, methacrylamide, N-hydroxy-methylacrylamide, N-hydroxymethylmethacylamide, N-methoxymethylacrylamide, N-methoxymethylmethacrylamide, ethyleneglycol monoacrylate, ethyleneglycol monomethacrylate and the like. The choice of the monomer depends primarily on economic conditions, and, for that reason, acrylic acid, methacrylic acid, acrylamide and mixtures thereof preferably are used. The term "water-soluble monomer whose uncrossed-linked polymer is water-soluble or forms a gel" also includes ethylenically unsaturated monomer mixtures containing a major part of monomers whose uncrossed-linked polymers are water-soluble and a minor part of monomers whose uncrossed-linked polymers are water-insoluble.

The amount of said water soluble monomer used depends on many factors such as alumina hydrogel amount, monomer type, desired apparent density of the calcined and beads, etc. Generally the amount of said monomer is between 0.25 and 20% by weight of the aqueous mixture. It has been observed that the behavious of beads obtained with the process of the invention depends on the respective amounts of alumina hydrogel and monomer. Preferably, the monomer is used in an amount corresponding to about 5 to 150% of the alumina hydrogel by weight (based on oxide). Higher amounts on monomer may induce a disaggregation of the beads when these latter are calcined. Too low an amount of monomer result in the production of beads which are not readily workable and not very firm. In order to obtain beads which present after calcination, interesting properties with regard to density and mechanical resistance, aqueous mixtures in which the amount of monomers corresponds to about 5 to 75% by weight of the alumina hydrogel by weight (based on oxide), preferably are used.

The starting mixture is dispersed into a substantially water-immiscible fluid, having a temperature between about 50° and 105° C, at atmospheric pressure. Preferably, the aqueous mixture is introduced with the aid of calibrated orifices or nozzles in order to obtain a subdivision of said mixture in the form of droplets which are dispersed into the fluid. The residence time of the droplets in the fluid must be sufficient to permit the polymerization of the monomer. This water immiscible fluid may be a gas, such as dry air, which is introduced into a tower in countercurrent flow to the droplets of the starting aqueous mixture. Another advantageous embodiment of the invention consists of using, as the fluid, a water-immiscible liquid. This liquid may have a density higher than that of the beads to be prepared. In such case, the starting aqueous mixture is introduced as droplets at the bottom of a column containing the liquid and the beads formed are recovered from the surface of the liquid. Another embodiment consists of using a liquid medium whose density is lower than that of the beads, and more particularly a mineral oil. A generally used such technique is described in U.S. Pat. No. 2,620,314. Such technique consists in using a column filled with hot oil in which droplets of an aqueous mixture are let to fall, the residence time of the droplets in the oil being sufficient to allow the polymerization of the polymer. Temperature of the liquid is at least equal to about 50° C in order to reduce the polymerization time. Temperatures higher than about 105°–110° C result in evaporation of water and a disaggregation of beads unless the process is carried out under pressure. According to a preferred embodiment, the temperature of the water-immiscible liquid is between 75° and 100° C, at atmospheric pressure.

In order to reduce the time needed for the beads to form, it is advantageous to use means for promoting the polymerization of the monomers. Free radical catalysis techniques with peroxidic compounds are quite useful, and particularly useful is redox system catalysis, which consists of using as catalysts a combination of a peroxidic compound and a reducing agent. Persulphuric acid, hydrogen peroxide, perboric acid and their salts, particularly sodium, potassium or ammonium persulphates and the water-soluble peracids, such as peracetic acid, are examples of useful peroxidic compounds, Reducing agents may be selected from the group consisting of sodium thiosulphate, sodium hyposulphite or dithionite, sodium or potassium bisulfite, N, N, N', N'-tetramethylethylenediamine, sodium formaldehydo-sulfoxylate, hydrazine, ascorbic acid, etc.. A part of the reducing agent may be introduced into the starting aqueous mixture, the other part being added into the water-immiscible fluid in which the polymerization is performed to the extent such reducing agent is soluble in the fluid. It also may be added into the vessel in which the beads are recovered.

The term "polymerization catalyst" as used herein, includes the peroxidic compound when this latter is used with or without reducing agent. The amount of polymerization catalyst can vary widely and it depends on the inhibitor content of the monomer used. Generally, the amount of polymerization catalyst is between about 0.05 and 2% by weight of the aqueous mixture when the monomer is substantially free from inhibitors.

The mixture subjected to polymerization may contain a cross-linking agent which has functional groups so that the polymer chains are linked together and form a three dimensional structure. Cross-linking agents may be 1,3-di(acryl-or methacryl-amidomethyl)-2-imidazolidone, hexahydrotriacryloyltriazine, N, N'-methylidene-bis-acrylamide and alkylidene-bis-acrylamide, such as N, N'-methylene-bis-acrylamide and N, N'-ethylidene-bis-acrylamide when the acrylic monomer used has an amide group, an aldehydic compound may be used as cross-linking agent, such as formaldehyde and glyoxal. Glyoxal reacts with a part of acrylamide to form N,N'-dihydroxy-ethylene-bis-acrylamide. It is not necessary to add a cross-linking agent when the acrylic monomers are in an acid medium, but it may be useful to reduce attrition of the beads formed. The amount of cross-linking agent does not generally exceed 1% of the weight of the aqueous mixture, although higher amounts may be used, but without any significant advantage.

The starting aqueous mixture must be sufficiently free flowing to be easily introduced as droplets, into the fluid medium wherein the polymerization is performed. However, in certain cases, this mixture tends to become stiffened and then dropwise flow is practicaly impossible. For instance, by adding acrylic acid to alumina hydrogel, a stiffening may occur with formation of a system having some rigidity. However, it has been found that the addition of certain acids allows avoidance of this drawback. Experiments performed on aqueous mixtures of alumina hydrogel, monomers and catalyst have shown that the better results are obtained with perchloric acid $HClO_4$ which presents the further advantage of allowing the production of beads having a high mechanical strength. Further, it has been found that perchloric acid may be substituted by up to 50% by weight of another acid such as a halogenated acid, phosphoric acid, an aliphatic mono or dicarboxylic acid, substituted or unsubstituted, nitric acid or the like. Among these acids which can be used in admixture with perchloric acid, hydrochloric acid, formic acid, acetic acid, oxalic acid, trichloracetic acid and the like are preferred. The amount of acid to eventually use may be easily determined by those skilled in the art. Such amount depends on alumina hydrogel type, the monomer type and the desired fluidity of the starting aqueous mixture. This amount of acid ($HClO_4$ or mixture $HClO_4$ and another acid) generally is betweem 0.5 and 10% by weight of the starting aqueous mixture.

The beads obtained are subjected to a thermal treatment, usually drying at a temperature of about 110° C. When used as catalysts or catalyst supports, the beads are calcined by progressively increasing the temperature up to about 400° to 800° C, preferably 500° to 700° C. During this calcination the organic matter contained in the beads is destroyed and the final beads consist essentially of firmly agglomerated alumina.

The hydrotreatment catalysts prepared by the process of the present invention preferably comprise about 2 to 8% by weight of at least an oxide or sulphide of a Group VIII metal, particularly cobalt or nickel, and about 5 to 30% by weight of at least an oxide or sulphide of a Group VI B metal, particularly molybdenum or tungsten. More particularly, the catalysts comprise from 2 to 5% by weight of cobalt oxide or sulphide and from 5 to 15% by weight of molybdenum oxide or sulphide or from 4 to 8% by weight of nickel oxide or sulphide and from 5 to 15% by weight of molybdenum oxide or sulphide.

The following examples are presented to illustrate the present invention but are not to be considered as limiting. Except as otherwise specifically stated, the percentages indicated in the examples are expressed by weight. In the examples, the mechanical resistance of the beads is expressed by the crushing resistance measured with the Tablet Hardness Tester apparatus (of Manestry machines Ltd., Liverpool, Great Britain), in which the bead is placed between two plates, one of which is fixed and the other moves for increasing weight. The mechanical resistance values given in the examples are the average values of experiments performed on five beads. In determining the usefulness of the present catalysts the relative space activity is considered. In such case, the space activity of a reference catalyst is determined such reference catalyst being a commercial catalyst which contained 18.8% by weight of molybdenium oxide, 5.2% by weight of nickel oxide, less than 0.06% of cobalt oxide, 10.9% of $SiO_2$, the remainder being alumina. The relative space activity of the catalyst is the number of m³ of feed to desulphurize which can be treated per m³ of catalyst per hour, to obtain a determined desulphurization of the fraction being treated, divided per the number of m³ of feed which can be treated per m³ of reference catalyst per hour to obtain the same degree of desulphurization. This relative space activity (RSA) of a catalyst is given by the following formula.

$$RSA = \frac{(LHSV) x}{(LHSV) \text{ ref}} \times 100$$

wherein LHSV is the liquid hourly space velocity of the treated feed, ref. is the reference catalyst and $x$ is the catalyst studied. The level of desulphurization which is considered is 70% of residual sulphur for a gas oil, 10% of residual sulphur for a naphtha, and 24% of residual sulphur for a petroleum distillation residue.

EXAMPLE 1

Part A — Preparation of the catalyst

Alumina hydrogel was prepared from aluminium sulphate and caustic soda up to ph 9, thereafter the gel was waterwashed, dried at 110° C, crushed and sieved. This alumina hydrogel was used to prepare an aqueous mixture containing

| | |
|---|---|
| alumina hydrogel | 10.55% (based on $Al_2O_3$) |
| acrylic acid | 1% |
| dihydroxyethylene-bis-acrylamide | 0.05% |
| ammonium persulphate | 0.20% |
| sodium bisulphite | 0.020% |

This mixture was injected, dropwise, at low pressure, into a column containing oil heated at 95° c (paraffinic oil : $d_{15}^4 = 0.83$). Beads were obtained, aged with an ammonium solution, washed and dried. These beads were impregnated with an ammonium heptamolybdate solution, dried, and impregnated with a cobalt nitrate solution and then again dried and calcined at 575° C. The catalyst was obtained in the form of beads contained 3.84% of cobalt oxide and 12.40% of molybdenum oxide, the remainder being alumina. The average diameter of 96% of the beads was between 1 and 2 mm.

Part B — Determination of catalytic activity.

The catalyst was subjected to a presulphurization, by treating it in a reactor with a gas mixture of hydrogen (85% by volume) and $H_2S$ (15% by volume), with a flow rate of 0.5 l/h. The temperature was increased to 400° C in 8 hours, and maintained at 400° C for an additional 8 hours. The mixture was then cooled to 275° C for 2 hours under the flow of the gas mixture. This gas mixture was replaced by hydrogen. Temperature was maintained at 275° C, but the pressure was increased to 35 Kg/cm². A gas oil distilling between 193° and 382° C and containing 1.002% by weight of sulphur was treated. Several experiments were performed at different hourly space velocities which were respectively 3.4, 5.0, 8.0 and 12 liters of gas oil per liter of catalyst per hour, by using 450 m³ of hydrogen per m³ of gas oil. Under the same conditions, this gas oil was subjected to a hydrodesulphurization treatment in the presence of the reference catalyst, hereabove described, which previously has been subjected to the sulphurization treatment. The reference catalyst was considered to have a space activity equal to 100. In comparison the space activity of the present catalyst is 149. By way of comparison, space activity of three other commercial catalysts, also containing oxides of Groups VIII and VI B metals and of alumina, was determined. The average relative space activity of these catalysts was 93.

EXAMPLE 2

The procedure of Part A of Example 1 was repeated except that the aqueous mixture which was used contained 0.75% by weight of acrylic acid and 0.30% by weight of acrylamide instead of 1% of acrylic acid. This catalyst was used as described in Part B of Example 1, for hydrodesulfurizing gas oil. The relative space activity of this catalyst was 142.

EXAMPLE 3

An aqueous mixture was prepared containing the following:

| | |
|---|---|
| alumina hydrogel | 15.6% (based on $Al_2O_3$) |
| perchloric acid | 3.6% |
| acrylic acid | 2.1% |
| N,N'-methylidene-bis-acrylamide | 0.25% |
| ammonium persulphate | 0.094% |
| sodium bisulphite | 0.0094% |

This mixture was injected dropwise at the bottom of a column containing Phenoclor DP4 (chlorinated diphenyl solid by PROGIL S. A. and having a density of 1.39 at 100° C) heated at 95° C. Beads were formed and recovered from the surface of the liquid. The beads were waterwashed and dried. Thereafter, the beads were impregnated with a solution containing ammonium molybdate and cobalt nitrate, and calcined at 650° C. The beads obtained contained 3.08% by weight of CoO, 8.61% of $MoO_3$, the remainder being alumina. The average crushing strength was 6.25 kg and the apparent density was 0.9 g/ml. This catalyst was used as described in Part B of Example 1, for hydrodesulphurizing gas oil. The relative space activity of this catalyst was 112.

EXAMPLE 4

An aqueous mixture was prepared containing the following:

| | |
|---|---|
| alumina hydrogel | 22% (based on $Al_2O_3$) |
| methacrylic acid | 1.8% |
| acrylonitrile | 0.4% |
| $HClO_4$ | 4.2% |
| N,N'-methylidene-bis-acrylamide | 0.4% |
| ammonium persulphate | 0.32% |
| sodium bisulphite | 0.032% |

The beads were recovered at the bottom of the column containing paraffinic oil heated at 95° C. They were waterwashed, dried at 110° C and calcined at 700° C. Thereafter the beads were successively dipped, with drying between each impregnation, into aqueous solutions of nickel nitrate, cobalt nitrate and metatungstic acid. After final drying and calcining, a catalyst was obtained with an alumina support, the catalyst containing in addition to the alumina, 2.6% of nickel oxide, 5% of cobalt oxide and 23.3% of tungsten oxide. This catalyst was used as described in Part B of Example 1. Its relative space activity was 105.

EXAMPLE 5

An aqueous mixture was prepared containing the following:

| | |
|---|---|
| alumina hydrogel | 20% (based on $Al_2O_3$) |
| acrylamide | 5.2% |
| glyoxal | 0.25% |
| perchloric acid | 3.6% |
| ammonium persulphate | 0.57% |
| sodium bisulphite | 0.057% |

The beads were recovered at the bottom of the column and were waterwashed, aged in isopropanol for 3 hours and thereafter dried at 110° C and calcined at 700° C. The beads were then impregnated with a solution containing ammonium heptamolybdate and cobalt nitrate, dried at 110° C and calcined at 575° C. The catalyst so prepared was obtained in the form of beads and contained 12.2% of molybdenum oxide and 3.4% of cobalt oxide. This catalyst was used so as described in Part B of Example 1. Its relative space activity was 122.

EXAMPLE 6

An aqueous mixture was prepared containing the following:

| | |
|---|---|
| alumina hydrogel | 10.55% (based on $Al_2O_3$) |
| molybdenum oxide | 1.48% |
| acrylic acid | 0.8% |
| ethylene glycol acrylate | 0.3% |
| perchloric acid | 1.2% |
| dihydroxyethylene-bis-acrylamide | 0.05% |
| ammonium persulphate | 0.20% |
| sodium bisulphite | 0.02% |

This mixture was injected dropwise into a column containing paraffinic oil heated at 95° C. Beads were recovered at the bottom of the column, waterwashed, dried and calcined and thereafter, impregnated with a cobalt acetate aqueous solution. After drying and calcining at 575° C, a catalyst was obtained containing 4.12% of cobalt oxide and 11.75% of molybdenum oxide, the remainder being alumina. This catalyst was used as described in Part B of Example 1. Its relative space activity was 156.

EXAMPLE 7

An aqueous mixture was prepared containing the following:

| | |
|---|---|
| alumina hydrogel | 10.80% (based on $Al_2O_3$) |
| sodium silicate | 0.15% (based on $SiO_2$) |
| molybdenum oxide | 1.25% |
| cobalt nitrate | 0.35% (based on cobalt oxide) |
| acrylic acid | 1.2% |
| perchloric acid | 2.2% |
| dihydroxyethylene-bis-acrylamide | 0.06% |
| ammonium persulphate | 0.2% |
| sodium bisulphite | 0.02% |

This mixture was injected dropwise into a column containing paraffinic oil heated at 95° C. Beads were recovered at the bottom of the column, waterwashed, dried and calcined. The catalyst beads contained about 11.5% of molybdenum oxide, 3.1% of cobalt oxide and 1.3% of silica, the remainder being alumina. This catalyst was then subjected to a presulphurization as described in Part B of Example 1. Thereafter, the gas mixture containing hydrogen and $H_2S$ was replaced by hydrogen. The temperature was increased to 400° C and the pressure to 100 kg/cm². A residue distilling above 350° C and containing 4.1% by weight of sulphur has been treated.

Several experiments were performed at different hourly space velocities which varied between 0.25 and 2 liters of feed per liter of catalyst per hour, by using 100 m³ hydrogen per m³ of feed. Under the same conditions, this residue was subjected to a hydrodesulfurization treatment in the presence of the reference catalyst hereabove described, which had previously been subjected to a sulphurization It was considered that the reference catalyst had a space activity equal to 100 and the relative space activity of the catalyst prepared in this example was 132. In the experiment wherein the hourly space velocity was 0.25 liter of feed per liter of catalyst per hour, 26% of a light fraction having a boiling point under 350° C was produced.

EXAMPLE 8

Part A of Example 1 was repeated except that the aqueous mixture was prepared as follows: 33.7 g. of alumina hydrogel (containing 23% water), 3.5 g. of molybdenum sulphide and 1.71 ml of a 70% perchloric acid solution were successively added to 142.7 g. of water. To this was added 6.67 ml of a solution containing 60% of acrylic acid and 3% of dihydroxyethylene-bis-acrylamide, 4 ml. of a 10% ammonium persulphate solution and 2 ml of a sodium bisulphite solution. The beads were recovered at the bottom of a column containing oil heated at 95° C, dried at 120° C and calcined at 500° C. The crushng strength of the beads was 3.7 kg.

The beads were impregnated with a cobalt nitrate solution, and after calcination, the catalyst obtained contained 5.7% of molybdenum and 2.65% of cobalt (based on metals). The relative space activity of the catalyst for the gas oil as determined in accordance with Part B of Example 1, was 105.

EXAMPLE 9

An aqueous mixture was prepared containing the following:

| | |
|---|---|
| alumina hydrogel | 15% (based on $Al_2O_3$) |
| perchloric acid | 1.7% |
| acrylic acid | 1% |
| dihydroxyethylene-bis-acrylamide | 0.050% |
| ammonium persulphate | 0.6% |
| sodium bisulphite | 0.06% |

The mixture was dispersed into a column containing oil as described in Example 1. 200 g. of the recovered undried beads were dipped into 120 g. of an ammonium heptamolybdate solution corresponding to 8% of $MoO_3$, for 16 hours. The beads were filtered, dried and calcined. They contained 12.3% of $MoO_3$. Thereafter, they were impregnated under vacuum with a cobalt nitrate solution and again dried and calcined. The catalyst obtained contained 12% of $MoO_3$ and 3.4% of CoO. Its relative space activity was 107.

What is claimed is:

1. A process for producing catalysts for hydrotreating petroleum fractions, said catalysts containing, after thermal treatment, at least an oxide or a sulphide of a Group VIII metal and at least an oxide or a sulphide of a Group VI B metal and an alumina support, said process comprising
   preparing said catalyst in the form of beads by agglomeration of alumina by polymerizing, in a hot substantially water-immiscible fluid medium, an aqueous mixture consisting essentially of about 5–30% by weight of alumina hydrogel based on alumina and about 0.25–20% by weight of a water-soluble acrylic monomer which is polymerizable to an uncrossed-linked water-soluble polymer or an uncrossed-linked gel polymer, said acrylic monomer being of the formula

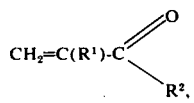

wherein $R^1$ is selected from a group consisting of —H and —$CH_3$ and $R^2$ is selected from the group consisting of —$OR^3$ and —$NR^3R^4$, wherein $R^3$ and $R^4$ are selected from the group consisting of —H and a hydrophylic radical;
   dispersing said aaqueous mixture in the form of droplets into said fluid medium to effect polymerization of the monomer;
   recovering the polymerized beads dispersed in said fluid medium; and
   subjecting said beads to drying and calcining thermal treatment wherein said oxide or sulphide is introduced into said beads prior to said thermal treatment.

2. The process of claim 1 wherein said aqueous mixture consists essentially of about 5 to 30% by weight of alumina hydrogel based on alumina, about 0.25 to 20% by weight of said water-soluble acrylic monomer, and about 0.05 to 2% by weight of a polymerization catalyst for said monomer.

3. The process of claim 1 wherein said aqueous mixture is introduced as droplets into a water-immiscible fluid, having a temperature of 50° to 105° C, at atmospheric pressure.

4. The process of claim 1 wherein said aqueous mixture consists essentially of about 5 to 29.95% by weight of alumina hydrogel based on alumina, about 0.05 to 10% of at least a compound capable of generating an oxide or sulphide of Groups VIII and VI B metal, about 0.25 to 20% by weight of said monomer and 0.05 to 2% by weight of a polymerization catalyst for said monomer.

5. The process of claim 1 wherein said aqueous mixture contains a cross-linking agent which can react with said acrylic monomer.

6. The process of claim 1 wherein said aqueous mixture contains about 0.5 to 10% by weight of perchloric acid.

7. The process of claim 6 wherein said perchloric acid is used with an amount at most equal of an acid selected from the group consisting of halogenated acids, phosphoric acid, nitric acid or an aliphatic mono or dicarboxylic acid.

8. The process of claim 1 wherein the polymerization is carried out by distributing said aqueous mixture in the form of droplets and passing these droplets in counter-current flow to a dry hot gas.

9. The process of claim 1 wherein the polymerization is carried out by dispersing the aqueous mixture in the form of droplets at the bottom of a column containing a hot liquid having a density higher than that of the beads formed, and recovering said beads from the surface of the liquid.

10. The process of claim 1 wherein the polymerization is carried out by dispersing said aqueous mixture at the head of a column containing a hot liquid having a density lower than that of the beads, and recovering the beads formed from the bottom of the column.

* * * * *